United States Patent [19]
Alderson et al.

[11] 3,986,573
[45] Oct. 19, 1976

[54] UTILITY TRACTOR

[76] Inventors: Robert C. Alderson, 309 W. Monroe, Greenwood, Miss. 38930; Robert H. Alderson, P.O. Box 197, Port Gibson, Miss. 39150

[22] Filed: May 29, 1975

[21] Appl. No.: 581,738

[52] U.S. Cl. .............................. 180/19 R; 172/259
[51] Int. Cl.² ........................................ B62D 51/06
[58] Field of Search ................ 180/19 R, 19 H; 280/43.17, 150 A; 172/258, 259, 260, 42, 43

[56] References Cited
UNITED STATES PATENTS

| | | | |
|---|---|---|---|
| 1,550,291 | 8/1925 | Stull et al. | 126/271.3 |
| 1,612,823 | 1/1927 | Keese | 180/19 R |
| 2,228,723 | 1/1941 | Large | 172/259 |
| 2,368,290 | 1/1945 | Donald | 180/19 |
| 2,388,981 | 11/1945 | Kuntz | 97/48 |
| 2,484,264 | 10/1949 | Barnes | 97/48 |
| 2,489,274 | 11/1949 | Donald | 50/26 |
| 2,545,735 | 3/1951 | Howard | 180/19 |
| 2,597,107 | 5/1952 | Kelsey | 180/19 R X |
| 2,711,124 | 6/1955 | Conwell | 97/29 |
| 3,016,957 | 1/1962 | Olson | 172/42 |
| 3,166,140 | 1/1965 | Butler | 180/19 |
| 3,647,005 | 3/1972 | Boyd | 172/259 |
| 3,680,640 | 8/1972 | Dawson | 172/258 |

*Primary Examiner*—M. H. Wood, Jr.
*Assistant Examiner*—R. Schrecengost
*Attorney, Agent, or Firm*—Morton, Bernard, Brown, Roberts & Sutherland

[57] ABSTRACT

A hand guided, motor driven, utility tractor having a single drive wheel which is rotatably mounted on a frame approximately ½ to ⅔ of the length of the frame away from its front end and which is driven by an engine mounted on the frame forward of the drive wheel. A beam is adjustably mounted on the frame to the rear of the drive wheel for attaching plows, discs or a variety of other devices for planting, tilling, smoothing or otherwise modifying land in the path of the drive wheel. A stabilizer wheel, preferably with a cutter portion adapted to penetrate the soil, is adjustably mounted on the frame forward of the drive wheel and disposed forward and below the engine. A hand control lever is mounted on a handle structure extending upwardly and rearwardly from the frame and simultaneously raises, or lowers, the tool attachment beam and the stabilizer wheel.

7 Claims, 6 Drawing Figures

FIG. 3

UTILITY TRACTOR

This invention relates to hand guided, motor driven utility tractors adapted to carry tools for earth working and more particularly to an improved single drive wheel utility tractor having the engine mounted forward of the drive wheel, an adjustable beam disposed to the rear of the drive wheel and adapted for attachment of a variety of tools, an adjustable stabilizer wheel disposed forward of the drive wheel, preferably having a cutter portion adapted to provide lateral stability, and positioning means adapted for simultaneously raising, and lowering, the stabilizer wheel and tool attachment beam to provide ease in turning the tractor.

It is conventional in the art of hand guided, motor driven tractors to construct farm and garden-type tractors with the ground working tool behind a single drive wheel and the engine forward of the drive wheel. In tractors of this construction, auxiliary wheels have been mounted in the rear for depth control of the ground working tool but have not provided lateral stability; and when a front auxiliary wheel has been utilized, difficulties have been encountered in maneuvering the tractor due to lack of adjustability of the auxiliary wheel.

The object of the present invention is directed at overcoming the above, and other, difficulties and disadvantages of prior hand guided, motor driven tractors by providing a stabilizer wheel disposed below the forward end to provide lateral stability and adjustable mounting and positioning means for simultaneously raising the stabilizer wheel and tool attachment beam to permit power, or pivot turns with less operator effort. The single wheel construction of the tractor of the present invention facilitates tight turns in confined areas. The engine position forward of the drive wheel in the present invention contributes to the low center of gravity of the tractor to provide easier handling and less operator fatigue and increases the overall effective weight on the drive wheel by a factor of the amount of pressure the operator exerts downward on the handles to level the tractor. Slight lifting or depressing of the handles by the operator will adjust the depth or amount of work that the attached tool will accomplish.

The mounting of the tool attachment beam in the rear provides space for a large tool, such as a disc, which travels in the path of the drive wheel. A wide variety of attachments can easily be attached to the tractor, since the beam provides an efficient and exceedingly simple means of quickly attaching and detaching a tool. An adjustable connecting rod permits manual adjustment of the height of the beam to accommodate different tools. Because of the precise balance and ease in handling provided by the novel features and arrangement of the present invention, the tractor can carry large and heavy tool attachments and still be easily turned with little operator fatigue.

Preferably, the tractor of the present invention has a stabilizer wheel with a wide central portion, and a narrow cutting portion mounted by a knee action joint spring biased in the downward position so as to cut into the ground being worked, up to the depth of the wide central portion. Additional lateral stability of the tractor is achieved from the effect of the cutter portion cutting into the ground. The cutter is prevented from going to an excessive depth by the wide portion of the stabilizer wheel. The tractor of the present invention further includes a hand control lever mounted on the handles and adapted for simultaneously raising, and lowering, the beam and the stabilizer wheel with a counterbalanced rod connecting the beam and the knee action joint of the stabilizer wheel to facilitate this adjustment.

The above and other advantages, features and characteristics of the invention are described in further detail in the following detailed description of a preferred embodiment of the invention, throughout which reference is had to the accompanying drawings in which:

Figure 3:
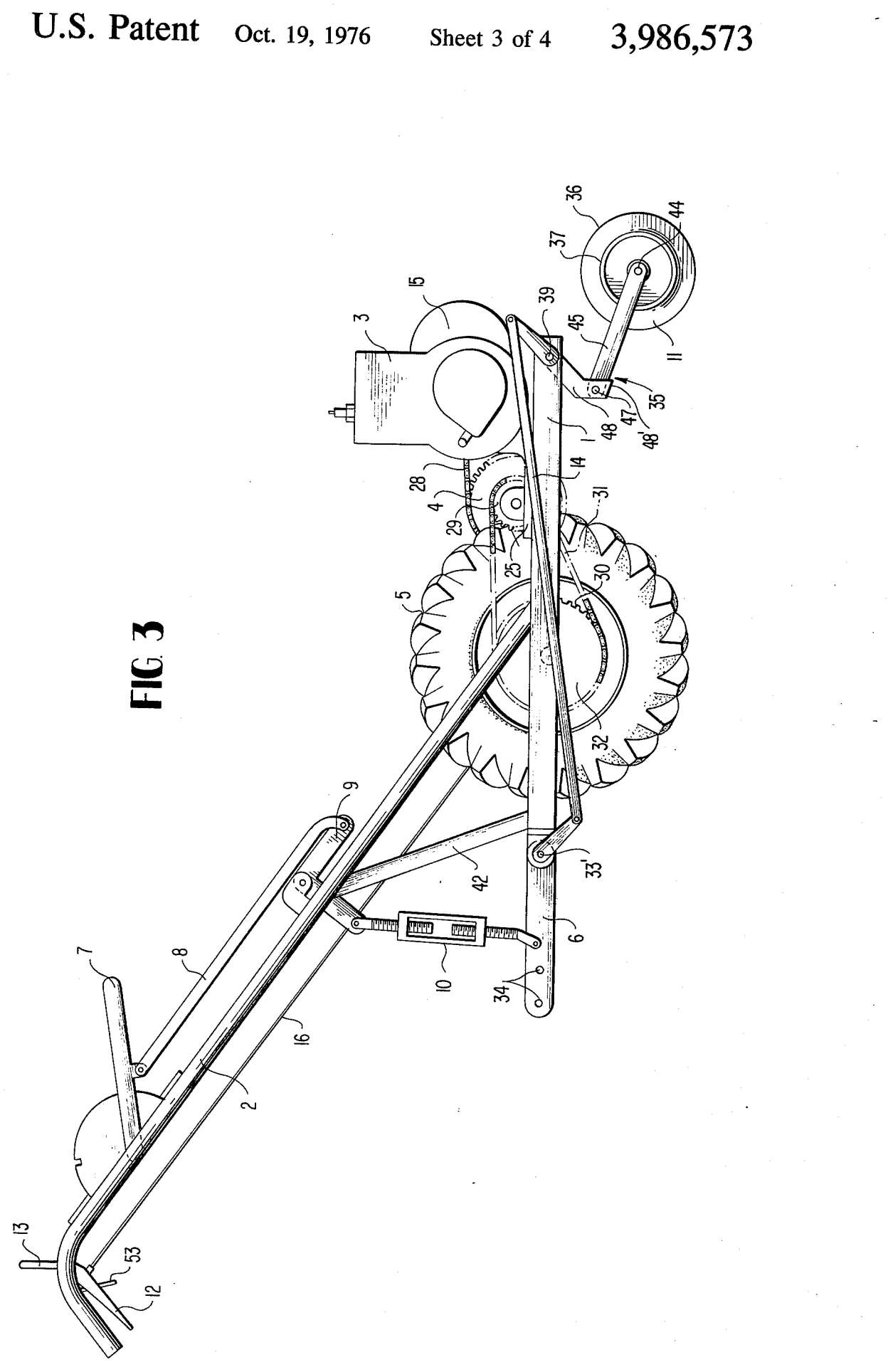

FIG. 3 is a side view of the opposite side of the tractor shown in FIG. 1.

Figure 1:
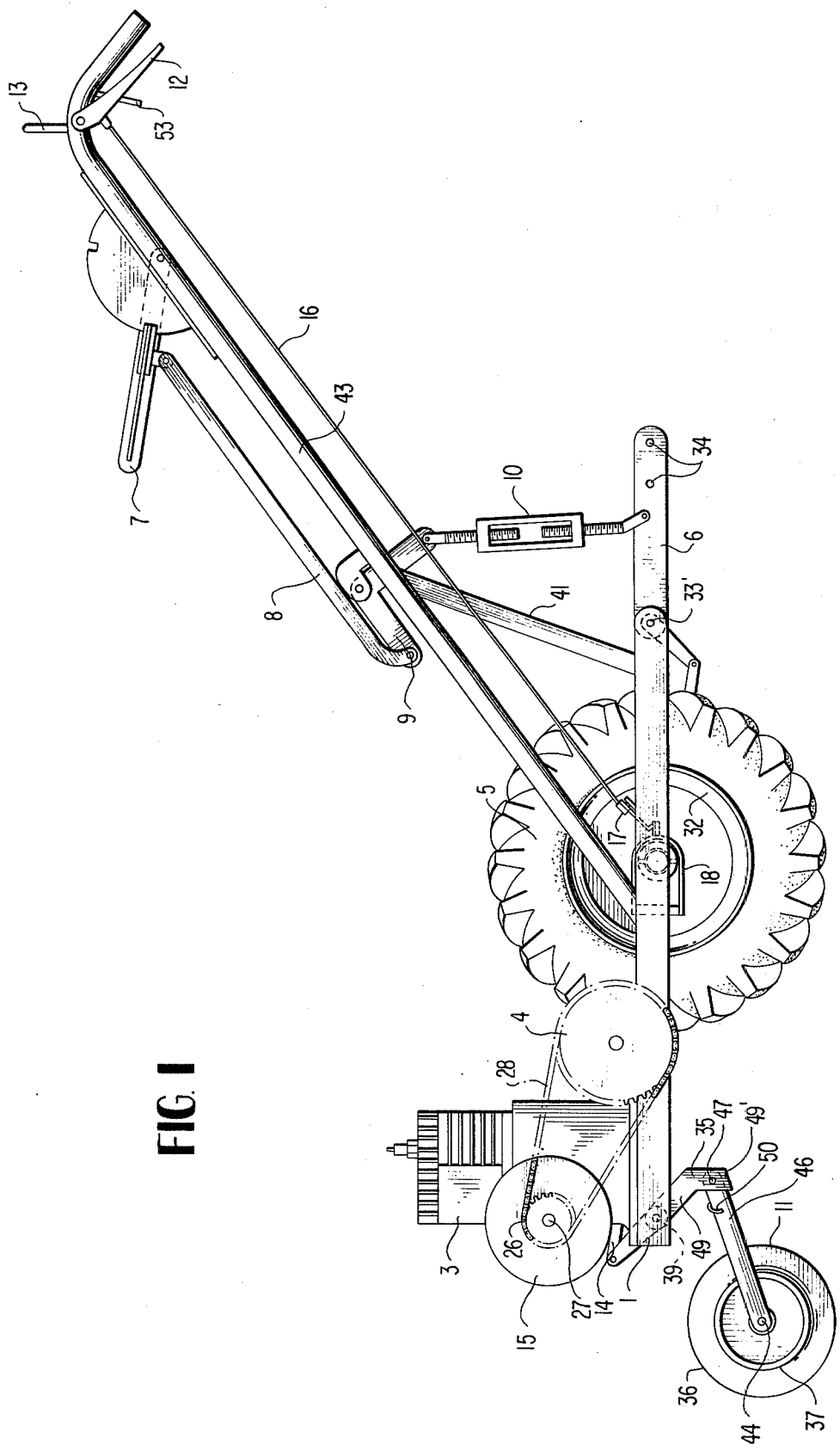
FIG. 1 is a side view of a utility tractor embodying the present invention.
Figure 2:
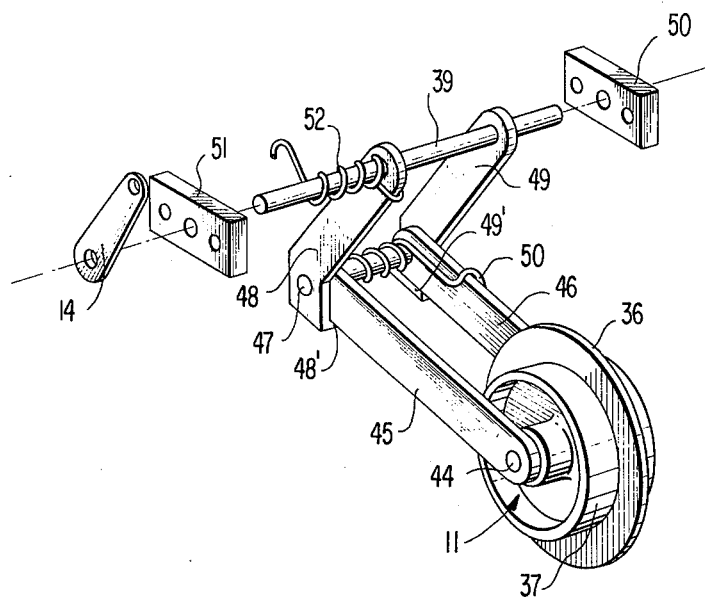
FIG. 2 is a fragmentary end view showing the preferred construction of the stabilizer wheel and its mounting.
Figure 5:
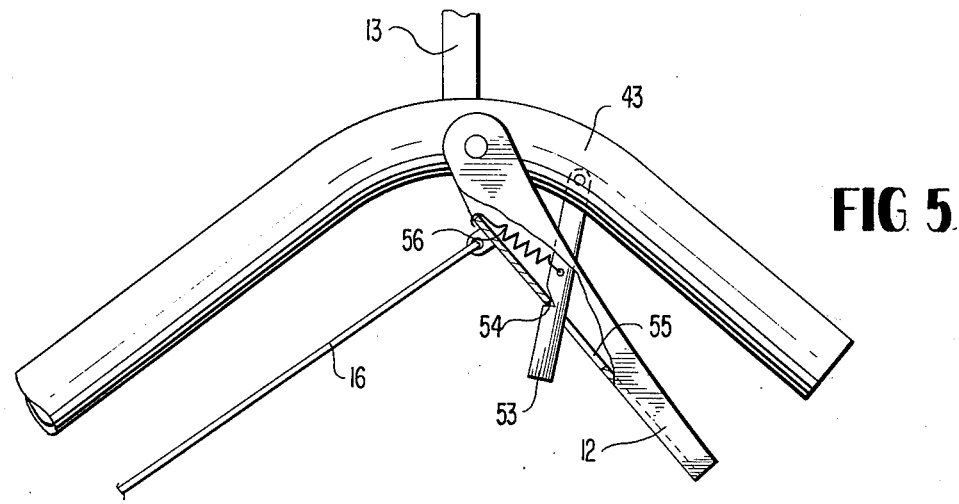
FIG. 5 is a fragmentary side view of the clutch lever.
Figure 6:
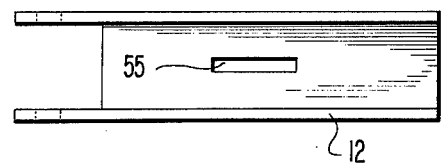
FIG. 6 is a fragmentary top plan view of the clutch lever.
Figure 4:
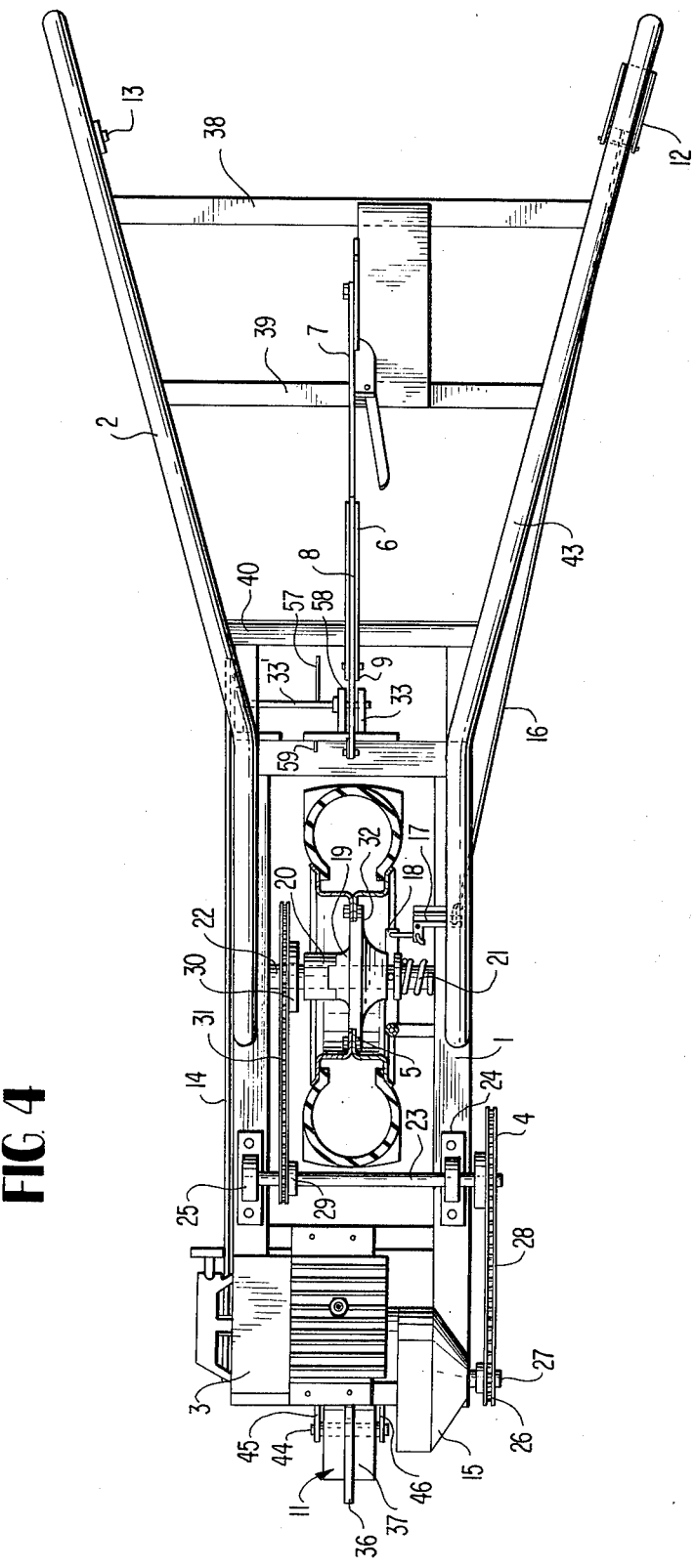
FIG. 4 is a fragmentary top plan view of the tractor in part.

With reference to the drawings, there is shown a utility tractor embodying the invention. This tractor has a rigid frame 1 on which is mounted an engine 3. Preferably, frame 1, as shown in the drawings, is of a size to conveniently move through crop rows, e.g. approximately 28 by 10 inches, rectangular in shape and is rigidly constructed from metal such as angle iron. Engine 3 may be an internal-combustion engine of known type, preferably, a one cylinder gasoline engine as shown in the drawings. Engine 3 has a driver sprocket 26 mounted on the output shaft 27 of a reduction gear box 15 driving driven sprocket 4 via a chain 28. Driven sprocket 4 is mounted on one end of an intermediate shaft 23 which is rotatably mounted in roller bearing pillow blocks 24 and 25 (which have bronze bushings) at each side of frame 1. A driver sprocket 29 is mounted near the end of intermediate shaft 23 opposite sprocket 4 and drives a driven sprocket 30 mounted on a main shaft 22 via a chain 31. Main shaft 22 is rotatably mounted in roller bearing pillow blocks (not shown) at each side of frame 1 approximately ½ to ⅔ of the length of frame 1 away from its front end and is always turning when engine 3 is operating. A drive wheel 5 is mounted on a hub 32 which is free spinning on main shaft 22. Drive wheel 5 may be, as shown in the drawings, a solid pneumatic or semipneumatic rubber or similar synthetic material and its diameter may be varied according to application and need. Alternatively, drive wheel 5 may be of an all metal construction with raised cleats for maximum traction.

A tool attachment beam 6 is adjustably mounted by bracket 33 at the center of the rear member of frame 1 so that it pivots vertically. Mounting holes 34 are provided at the end of beam 6 opposite to bracket 33 for the attachment of any of a variety of tools by any conventional means to accomplish the desired ground working operation.

A stabilizer wheel 11, which spring biased in the downward position, is rotatably mounted on a knee action joint 35. Knee action joint 35 is adjustably mounted on frame 1 forward of drive wheel 5 and forward and below engine 3 so that knee action joint 35 and stabilizer wheel 11 pivot vertically. Knee action joint 35 comprises two lower members 45 and 46 and two upper members 48 and 49. Stabilizer wheel 11 is rotatably mounted on axle 44 between the two lower members 45 and 46 of knee action joint 35. Lower members 45 and 46 are pivotally mounted at opposite ends of rod 47 which is secured in two upper members 48 and 49 of knee action joint 35. Upper members 48 and 49 extend beneath lower members 45 and 46 to form twin down stops 48' and 49' which limit the downward pivotal motion of lower members 45 and 46 and stabilizer wheel 11. A spring 50 is attached to lower member 46 and to rod 47 and encircles rod 47 to bias knee action joint 35 in the downward position. As stabilizer wheel 11 rolls over irregular ground, knee action joint 35 which is spring biased in the down position allows stabilizer wheel 11 to follow the contour of the ground without affecting the vertical position of the tool attached to the tool attachment beam 6 at the rear of frame 1. Upper members 48 and 49 are secured to rod 39 which is rotatably mounted in roller bearing pillow blocks 50 and 51 at the front end of each side of frame 1. Counterbalance spring 52 is attached to upper member 48 and to the front end of frame 1 and encircles rod 39 so that counterbalance spring 52 assists in raising stabilizer wheel 11 when tool attachment beam 6 is raised. Although a knee action joint spring biased in the downward position is preferred, a single segment connecting rod or any other conventional mounting may be used to provide rotation and vertical adjustment of stabilizer wheel 11. Preferably, stabilizer wheel 11 has an exterior cutter portion 36 which provides lateral stability by cutting into the ground and an interior wide portion 37 which prevents cutter portion 36 from going to an excessive depth.

Two handles 2 and 43 are attached to frame 1 slightly forward of main shaft 22 and are braced apart at the rear of frame 1 by cross bars 38, 39 and 40. Handles 2 and 43 extend upwardly and rearwardly from the frame and are also supported by braces 41 and 42 extending from each end of cross bar 40 to each end of the rear end member of frame 1.

A clutch face 20 is affixed to main shaft 22 and meshes with clutch face 19 affixed to hub 32 to drive wheel 5 when the faces are engaged. The clutch is engaged when clutch faces 19 and 20 are meshed by spring 21 located on the side of hub 32 opposite to clutch faces 19 and 20. The clutch is locked in the disengaged position by pivoting a clutch lever 12 mounted on handle 43 toward handle 43. As clutch lever 12 is moved toward handle 43, a notch 54 in a lockout lever 53 which is biased forward by a spring 56 engages a slot 55 in clutch lever 12 holding clutch lever 12 rearward in the disengaged position until lockout lever 53 is manually moved rearward and clutch lever 12 allowed to move away from handle 43. Rearward movement of clutch lever 12 pulls clutch pull rod 16 to actuate a bell crank lever 17 which pulls the clutch yoke 18. The movement of clutch yoke 18 pulls clutch face 19 out of mesh with clutch face 20 so that drive wheel 5 remains stationary on free spinning hub 32 as main shaft 22 turns. An engine speed control lever 13 is mounted on handle 2 and controls the engine speed via a flexible cable (not shown) by conventional means.

In the preferred embodiment shown in the drawings, movement of hand control lever 7, pivotally mounted on cross bars 38 and 39, moves connecting rod 8 to actuate bell crank lever 9 which moves an adjustable connecting rod 10 to raise or lower beam 6. Bell crank 9 is placed forward of adjustable connecting rod 10 so that the force from movement of the tool and stabilizer wheel 11 over the ground will have less of a tendency to actuate bell crank 9. This arrangement decreases the stress on and avoids movement of the positioning means when the tractor is in operation. A rod 33' is secured to one end of tool attachment beam 6 within bracket 33 so that the pivotal movement of beam 6 in a vertical direction rotates rod 33'. Rod 33' is rotatably mounted in a roller bearing pillow block (not shown) at the side of frame 1. A connecting rod 14 is pivotally secured to rod 43 and to rod 39 at the side of the frame so that stabilizer wheel 11 is raised, or lowered, simultaneously upon movement of beam 6 and rotation of rod 33'. Clockwise rotation of rod 33' pivots connecting rod 14 rearward to rotate rod 39 in a counterclockwise direction and raise stabilizer wheel 11. Connecting rod 14 has three segments pivotally attached to each other in a counterbalanced position so as to aid in raising or lowering beam 6 and stabilizer wheel 11. Connecting rod 14 may have a turnbuckle (not shown) in its longest segment in order to adjust connecting rod 14 according to the position of tool attachment beam 6 as adjusted by adjustable connecting rod 10 to accommodate different tools while maintaining the three segments of connecting rod 14 in the same angular relationship. Alternatively, the holes at the ends of connecting rod 14 in which rod 33' and rod 39 are secured may have teeth corresponding to teeth at the ends of rod 33' and rod 39' to permit adjustment of the angular positions of the connecting rod 14. A plate 57 with a hole at its end away from rod 33' is secured to rod 33. Counterclockwise rotation of rod 33' carries plate 57 into mesh with a locking plate 59 having a corresponding hole mounted on the rear member of frame 1 so a bolt may be inserted (not shown) through the holes to hold rod 33' stationary and thus hold stabilizer wheel 11 in the raised position when desired. When tool attachment beam 6 is locked in the lowered position, rod 39 is effectively locked in position and knee action joint 35, biased in the down position by spring 50, allows stabilizer wheel 11 to follow the contour of the ground without affecting the vertical position of the tool attached to the tool attachment beam 6 at the rear of the frame. A locking plate 58 having a corresponding hole is mounted at the rear of bracket 33 so that a bolt (not shown) may be inserted through the holes to rod 33' stationary and thus hold stabilizer wheel 11 in the lowered positon when desired.

It is apparent from the foregoing description, taken in conjunction with the accompanying drawings, that the tractor described provides important advantages in operation. After selecting and attaching the necessary tool to accomplish the desired task, the operator begins with the hand control lever in the rear position (beam and stabilizer raised) and the clutch disengaged. The operator may then energize the powerplant, lower the beam and stabilizer, and then with a firm grip on the handles engage the clutch providing forward motion to the tractor. When the operator wishes to change direction, the clutch is disengaged, halting forward motion. The hand control lever is then moved to the rear position, raising the tool attached to the beam clear of the ground. This action also raises the stabilizer wheel clear of the ground and the tractor may be manually pivoted on the drive wheel or the clutch engaged for a powered turn. The sequence of lowering the beam and stabilizer and engaging the clutch after a manual turn may then be repeated.

The positioning means provided for simultaneous elevation or depression of the tool attachment beam and the stabilizer wheel give added ease in changing the direction of the machine since both are raised off the ground as the operator makes a power turn with the clutch engaged or a pivot turn on the drive wheel. The added lateral stability provided by the cutter portion of the stabilizer wheel prevents lateral wobbling and, consequently, vibration of the plow blade.

The tractor described is rugged in construction and relatively inexpensive to manufacture. It will provide long, trouble-free performance with a wide variety of tool attachments and improved maneuverability with less operator effort than has been possible with prior comparable hand guided, motor driven tractors.

What is claimed is:

1. A utility tractor adapted to be coupled to a ground working attachment comprising: a frame having a rear member, a front member and at least two side members; a single drive wheel rotatably mounted on and between the side members of the frame; an engine mounted on the frame forward of the drive wheel; transmission means operatively coupling the engine and the wheel so that the wheel is driven by the engine; a beam adjustably mounted on the rear member of the frame and adapted for attachment of a tool thereto; a stabilizer wheel rotatably and adjustably mounted on the frame forward of the drive wheel; tool lifting means adapted for simultaneously raising and lowering the beam and the stabilizer wheel including handle structure means mounted on the frame and extending upwardly and rearwardly of the drive wheel for operating the tool lifting means, means for connecting said handle to said beam, and means connecting said stabilizer wheel and said beam whereby raising and lowering of said beam simultaneously raises and lowers said stabilizer wheel.

2. A utility tractor adapted to be coupled to a ground working attachment comprising: a frame having a rear member, a front member and at least two side members; a single drive wheel rotatably mounted on and between the side members of the frame; an engine mounted on the frame forward of the drive wheel; transmission means operatively coupling the engine and the wheel so that the wheel is driven by the engine; a beam adjustably mounted on the rear member of the frame and adapted for attachment of a tool thereto; a stabilizer wheel rotatably and adjustably mounted on the frame forward of the drive wheel; means for adjustably mounting said stabilizer wheel on the frame by a knee action joint spring biased in the downward position; tool lifting means adapted for simultaneously raising and lowering the beam and the stabilizer wheel including handle structure means mounted on the frame and extending upwardly and rearwardly of the drive wheel for operating the tool lifting means.

3. A utility tractor as claimed in claim 2 wherein the stabilizer wheel has a wide central portion and an exterior narrow portion so as to cut into the ground worked up to the depth of the wide central portion.

4. A utility tractor as claimed in claim 2 further comprising locking means adapted to maintain the beam in the raised position and in the lowered position.

5. A utility tractor adapted to be coupled to a ground working attachment comprising: a frame having a rear member, a front member and at least two side members; a single drive wheel rotatably mounted on and between the side members of the frame; an engine mounted on the frame forward of the drive wheel; transmission means operatively coupling the engine and the wheel so that the wheel is driven by the engine; a beam adjustably mounted on the rear member of the frame and adapted for attachment of a tool thereto; a stabilizer wheel rotatably and adjustably mounted on the frame forward of the drive wheel; tool lifting means adapted for simultaneously raising and lowering the beam and the stabilizer wheel including handle structure means mounted on the frame and extending upwardly and rearwardly of the drive wheel including a handle for operating the tool lifting means, bell crank lever means operated by said handle, connecting rod means connecting said bell crank means to said beam, said bell crank means being placed forward of said connecting rod means whereby force from movement of the tool does not actuate the bell crank lever means, and means connecting said stabilizer wheel and said beam such that raising and lowering of said beam simultaneously raises and lowers said stabilizer wheel.

6. A utility tractor as claimed in claim 5 wherein the stabilizer wheel is adjustably mounted on the frame by a knee action joint spring biased in the downward position.

7. A utility tractor as claimed in claim 5 further comprising locking means adapted to maintain the beam in the raised position and in the lowered position.

* * * * *